(12) United States Patent
Neuner et al.

(10) Patent No.: US 6,559,764 B1
(45) Date of Patent: May 6, 2003

(54) AUTOMATIC GEARBOX FOR MOTOR VEHICLES

(75) Inventors: Josef Neuner, Raubling (DE); Rudolf Ehrmaier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/623,920

(22) PCT Filed: Feb. 1, 1999

(86) PCT No.: PCT/EP99/00632

§ 371 (c)(1),
(2), (4) Date: Sep. 11, 2000

(87) PCT Pub. No.: WO99/46520

PCT Pub. Date: Sep. 16, 1999

(30) Foreign Application Priority Data

Mar. 11, 1998 (DE) .......................... 198 10 479

(51) Int. Cl.⁷ ................................. B60Q 1/00
(52) U.S. Cl. ................ 340/438; 340/441; 340/456
(58) Field of Search ................ 340/438, 439, 340/441, 459, 456

(56) References Cited

U.S. PATENT DOCUMENTS 4,718,307 A  *  1/1988  Yabe et al.

\* cited by examiner

*Primary Examiner*—Daryl Pope
(74) *Attorney, Agent, or Firm*—Crowell & Moring LLP

(57) ABSTRACT

The invention relates to an automatic gearbox for motor vehicles, comprising an electronic drive control device and an electric gear range selecting element. In case the drive control device fails such that the gears can no longer be changed when the gear range selecting element is actuated with a view to changing gear range, and if the gears which can be changed by means of the gear range selecting element can be identified, the driver receives a corresponding optical, acoustic and/or haptic feedback signal which indicates said failure. In case the gera rage selecting element fails in such a way that the gear ranges adjustable by means of said gear range selecting element can no longer be identified, a corresponding optical, acoustic and/or haptic feedback signal which indicates said failure is immediately transmitted to the driver.

24 Claims, 1 Drawing Sheet

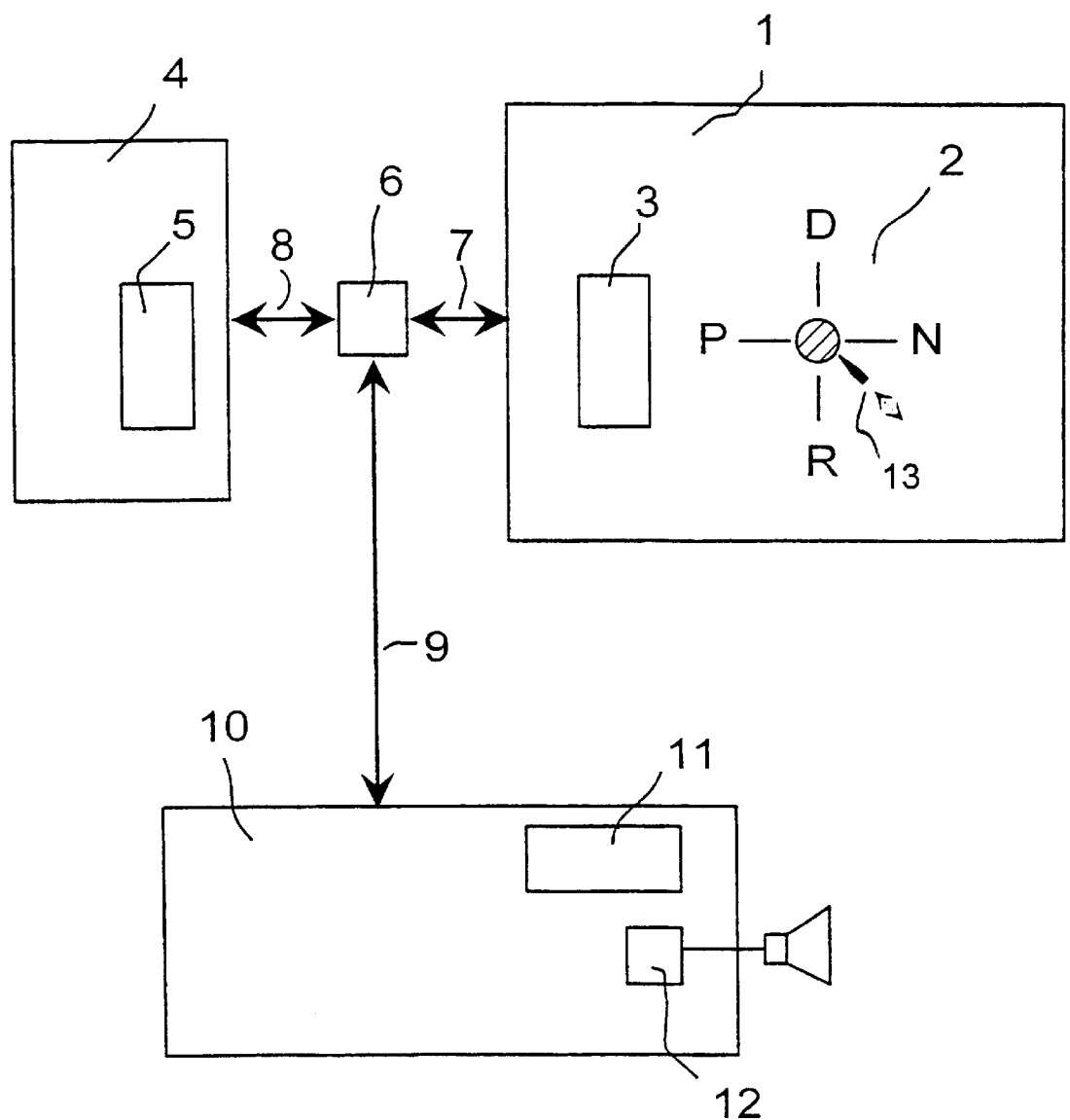

AUTOMATIC GEARBOX FOR MOTOR VEHICLES

The invention relates to an automatic transmission in motor vehicles according to the preamble of Claims 1 and 2.

German Patent Document DE 196 25 019 A1, for example, is based on such an automatic transmission. From that document, an electric driving position selecting element is known in the form of a selector lever which can be moved along the directions of a rectangular system of axes. The selector lever is equipped with electric shifting elements by means of which the respective selected driving position, such as B, P, R, N and D, is transmitted as an electric signal to the electronic transmission control unit. Corresponding to the selected driving position, the transmission control unit controls the required hydraulic and/or mechanical actuators in order to engage the selected driving position. The electric driving position selecting element can be independent of the transmission mechanism and of the hydraulic system of the transmission and only be electrically connected with the transmission control unit.

It is an object of the invention to warn the driver in the event of a failure of the electrical components in a differentiated manner but only if absolutely necessary.

This object is achieved by means of the characteristics of Claims 1 and/or 2. Advantageous further development of the invention are the objects of the subclaims.

According to the invention, in the event of a failure of the transmission control unit, particularly during the drive, such that a shifting operation can no longer be carried out, when the driving position selecting element is operated in the sense of a driving position change, a corresponding optical, acoustic and/or haptic feedback, which indicates this failure, is emitted to the driver if the driving positions which can be set by means of the driving position selecting elements can still be detected.

In addition or as an alternative, in the event of a failure of the driving position selecting element such that the driving positions, which can be set by the driving position selecting elements, can no longer be detected, a corresponding optical, acoustic and/or haptic feedback is immediately emitted to the driver which indicates this failure.

The optical, acoustic and/or haptic feedback in the event of a failure preferably takes place by an optical, acoustic and/or haptic reaction in the vehicle which is opposite to the optical, acoustic and/or haptic reaction when there is no failure.

In the event of a failure, the optical feedback may also be a differentiated fault report or instructions to carry out actions.

In an advantageous further development, the optical feedback in the event of a failure is the absence of a display which is emitted in the faultless case during each successful operation of the driving position selecting element. Such a display may, for example, in the faultless event, be the display of the selected driving positions or a flashing light which flashes during each successful operation of the driving position selecting element.

The acoustic feedback in the event of a failure is preferably the absence of an acknowledgment sound emitted in the faultless case during each successful operation of the driving position selecting element.

The haptic feedback in the event of a failure is preferably a detectable increase or decrease of the operating force required for the operation of the driving position selecting element.

In addition, when the vehicle is stopped, a repeated feedback can be emitted to the driver in order to remind him again of the failure. The stoppage of the vehicle can be detected by way of the signal of the driving speed v which exists in the vehicle anyhow. Likewise, when the vehicle is stopped or at a driving speed v of 0 km/h, the continued driving can be prevented. For this purpose, the engine is, for example, automatically switched off, the parking brake is automatically applied or the parking position is automatically engaged.

An embodiment of the invention is illustrated in the drawing. It shows an automatic transmission according to the invention which, on the one hand, is connected with an independent electric driving position selecting element and with an instrument cluster for the optical or acoustic feedback.

In a shifting block 1, which may be mounted, for example, in the steering wheel or in the center console of a vehicle interior, an independent electric driving position selecting element is integrated which has an operating part 2 and a selecting element control unit 3. The shifting block 1 is connected with the transmission control unit 5 of an automatic transmission 4 preferably by way of data bus connections 7, 8. By way of a gateway 6, the data bus connections 7, 8 are connected with a data bus 9 which leads to an instrument cluster 10. The instrument cluster 10 has a display 11 and a sound generating unit 12. Furthermore, the instrument cluster 10 may contain the usual instrument displays, such as a speedometer or a rotational speed display. The operating part 2 of the electric driving position selecting element can be moved along the direction of a rectangular system of axes. The operating part 2 is equipped with electric switching elements (not shown here) by means of which the respectively selectable driving position P, R, N and D are transmitted as electric signals by way of bus connections 6, 7, 8, 9 to the electronic transmission control unit 3 and/or to the electronic instrument cluster 10.

In the faultless case, the transmission control unit 5 controls the required hydraulic and/or mechanical actuators of the automatic transmission 4 corresponding to the selected driving positions in order to engage the selective driving positions and gears. The electric driving position selecting element 2, 3 is independent of the transmission mechanism and of the hydraulic system of the transmission. Furthermore, in the faultless case, the respectively selected driving position P, R, N or D is displayed by way of the display 11 of the instrument cluster 10. The display 11 may also be a flasher light, which flashes during each successful operation of the driving position selecting element 2, 3. As an alternative or in addition, in the faultless case, a pleasant acknowledgment sound can be generated by way of the sound generating unit 12 during each successful operation of the driving position selecting element 2, 3. Also as an alternative or in addition, a force governing device 13 can interact with the operating part 2 and, in the faultless case, set an ergonomically pleasant operating force which has to be applied by the driver for adjusting the operating part 2. The operating part 2 preferably has a center position (hatched circle) into which the operating part is returned after each operation of the driving position. selecting element in the P, R, N or D direction. The force governing unit 13 sets the operating force which is required for being able to change from the center position into a driving position.

If, for example, the transmission control unit fails during the drive such that a shifting operation is no longer possible, a waiting takes place according to the invention until the driving position selecting element 2, 3 is operated in the sense of a driving position change; that is, if, for example, before the failure of the transmission control unit 5, the driving position D (forward driving) was selected by means of the driving position selecting element 2, 3 and if, after the failure of the transmission control unit 5, for example, the driving position R is selected, an example exists of a driving position change. It is a prerequisite in this case that the driving position selecting element has not failed and the driving positions which can be set by the driving position selecting element can at least still be detected by the instrument cluster 10. Thus, if a driving position change is demanded, a feedback is emitted to the driver which draws the driver's attention to the failure of the transmission control unit 5. For this purpose, an optical feedback can be carried out in that, in contrast to its reaction in the faultless case, the display 11 will no longer light up or flash. As an alternative or in addition, the sound generating unit 12 can also be controlled such that the normally emitted acknowledgment sound does not occur. As a haptic feedback, the force governing device 13 is, for example, controlled such that the required operating force is increased in the sense of a blocking of the operating part 2 or is reduced to zero in the sense of an idle motion. As a result of these optical, acoustic and/or haptic reactions, which are opposite to the reactions in the faultless case, the driver is not only generally informed concerning the failure of any component, but also as to which component has failed. In order to draw the driver's attention early but not unnecessarily to the failure. before the emission of the feedback, the operation of the driving position selecting element in the sense of a driving position change is first awaited.

If the failure of the driving position element is such that the driving positions which can be set by the driving position selecting element can no longer be detected at least by the transmission control unit 5, a corresponding optical, acoustic and/or haptic feedback pointing to this failure is immediately supplied to the driver. This feedback may differ from that occurring when the transmission control unit 5 fails.

For example, in all fault cases, a differentiated fault report or instructions for a further action can be emitted by way of the display 11 or another fault display.

During a new start of the vehicle after a failure or when the vehicle comes to a stop after a failure. the corresponding feedback will be repeated in order to remind the driver of the failure.

The continued driving is preferably prevented when the transmission control unit 5 and thus the automatic transmission 4 can only still be operated in the emergency program, for example, exclusively the forward drive in the fourth. In order to prevent a continued driving, for example, after a new start, the internal-combustion engine can automatically be switched off again. However, the automatic engagement of the parking brake and/or of the parking position can also prevent the vehicle from starting to drive.

This automatic transmission according to the invention increases the safety in the event of a failure of an electronic component which is required for the faultless functioning of an automatic transmission.

What is claimed is:

1. An automatic transmission for a motor vehicle, having an electronic transmission control unit and an electric driving mode selecting element, wherein:

during a failure of the transmission control unit such that a shifting operation is no longer possible, at a time when driving modes which can set by the driving mode selecting element can be detected, an operation of the driving mode selecting element to change a driving mode causes a corresponding optical, acoustic and/or haptic feedback signal to be emitted to the driver, indicating said failure.

2. The automatic transmission according to claim 1, wherein:

upon occurrence of a failure of the driving mode selecting element such that driving modes that are selectable by the driving mode selecting element can no longer be detected, a corresponding optical, acoustic and/or haptic feedback indicative of this failure is immediately emitted to the driver.

3. The automatic transmission according to claim 1, wherein the optical, acoustic and/or haptic feedback is opposite to the optical, acoustic and/or haptic reaction in a case of fault free operation.

4. An automatic transmission according to claim 2, wherein the optical, acoustic and/or haptic feedback is opposite to the optical, acoustic and/or haptic reaction in a case of fault free operation.

5. The automatic transmission according to claim 1, wherein an optical feedback in the event of a failure is provided a differentiated fault report or instructions for actions to be carried out.

6. The automatic transmission according to claim 2, wherein an optical feedback in the event of a failure is provided a differentiated fault report or instructions for actions to be carried out.

7. The automatic transmission according to claim 1, wherein an optical feedback in the event of a failure is provided as an absence of a display which is emitted in a case of fault free operation during each successful operation of the driving mode selecting element.

8. The automatic transmission according to claim 2, wherein an optical feedback in the event of a failure is provided as an absence of a display which is emitted in a case of fault free operation during each successful operation of the driving mode selecting element.

9. The automatic transmission according to claim 1, wherein an acoustic feedback in the event of a failure is provided as an absence of an acknowledgment sound which is emitted in a case of fault free operation during each successful operation of the driving mode selecting element.

10. The automatic transmission according to claim 2, wherein an acoustic feedback in the event of a failure is provided as an absence of an acknowledgment sound which is emitted in a case of fault free operation during each successful operation of the driving mode selecting element.

11. The automatic transmission according to claim 1, wherein a haptic feedback in the event of a failure is provided as an increase or reduction of operating force required to operate the driving mode selecting element.

12. The automatic transmission according to claim 2, wherein a haptic feedback in the event of a failure is provided as an increase or reduction of operating force required to operate the driving mode selecting element.

13. The automatic transmission according to claim 1, wherein when the vehicle is stopped, a repeated feedback is emitted to the driver.

14. The automatic transmission according to claim 2, wherein when the vehicle is stopped, a repeated feedback is emitted to the driver.

15. The automatic transmission according to claim 1, wherein when the vehicle is stopped during occurrence of a failure, continued driving is prevented.

16. The automatic transmission according to claim 2, wherein when the vehicle is stopped during occurrence of a failure, continued driving is prevented.

17. A method of operating a vehicle automatic transmission having an electronic transmission control unit coupled electrically with an electric driving mode selecting element, said method comprising:

detecting a failure of the transmission control unit such that a shifting of the automatic transmission is not possible, at a time when driving modes set by an operation of the driving mode selecting element can be detected; and in response to an operation of the driving mode selecting element during said failure, generating a warning signal to a vehicle operator, indicating occurrence of said failure.

18. A method of signaling a failure of a vehicle automatic transmission control having an electronic transmission control unit coupled electrically to an electric drive mode selecting element, said method comprising:

upon occurrence of a failure of the transmission control unit such that shifting of the automatic transmission is not possible, at a time when selection of a driving mode by said driving mode selecting element can be detected, deferring issuance of a warning signal to a vehicle operator until operation of the driving mode selecting element is detected; and upon occurrence of a failure of the driving mode selecting element, such that an operation of the driving mode selecting element cannot be detected, generating a warning signal to the vehicle operator immediately.

19. An automatic gear mechanism for a motor vehicle comprising:

an electronic gear control unit;

an electric gear selection element; and a multi-purpose instruction; wherein in the case of a failure of the gear control unit gear-shifting is not possible, if gears engageable by the selection element are still recognizable at least by the multi-purpose instrument, actuation of the selection element for the purpose of gear changing causes an optical, acoustic and/or tactile signal indicating the failure to be sent to the driver.

20. The automatic gear mechanism according to claim 19, wherein if the gear control unit is intact but the gear selection element has failed such that the gears engageable by the selection element are no longer recognizable, at least by the control unit, an optical signal indicating the same failure is sent without delay to the driver via the same display unit used for indicating a failure of the gear control unit.

21. An automatic gear mechanism according to claim 19, wherein in the event of a failure the optical, acoustic and/or tactile signal is in the form of an optical, acoustic and/or tactile reaction in the vehicle of opposite nature to the optical, acoustic and/or tactile reaction in the absence of a fault.

22. An automatic gear transmission according to claim 21, wherein the optical signal in the event of a failure comprises absence of a display that is output after every successful actuation of the gear selection element in the absence of a fault.

23. The automatic gear mechanism according to claim 19, wherein if the vehicle comes to a stop, a repeat signal is set to the driver.

24. The automatic gear mechanism according to claim 19, wherein if the vehicle stops, it is prevented from moving further.

* * * * *